US011332146B2

(12) United States Patent
Uemori et al.

(10) Patent No.: US 11,332,146 B2
(45) Date of Patent: May 17, 2022

(54) VEHICLE TRAVELING CONTROL DEVICE, VEHICLE TRAVELING CONTROL METHOD, AND PROGRAM

(71) Applicant: Sony Corporation, Tokyo (JP)

(72) Inventors: Takeshi Uemori, Tokyo (JP); Atsushi Ito, Kanagawa (JP); Hideki Oyaizu, Tokyo (JP); Suguru Aoki, Tokyo (JP); Ryuta Satoh, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 96 days.

(21) Appl. No.: 16/638,140

(22) PCT Filed: Jul. 13, 2018

(86) PCT No.: PCT/JP2018/026525
§ 371 (c)(1),
(2) Date: Feb. 11, 2020

(87) PCT Pub. No.: WO2019/035300
PCT Pub. Date: Feb. 21, 2019

(65) Prior Publication Data
US 2020/0172110 A1 Jun. 4, 2020

(30) Foreign Application Priority Data

Aug. 18, 2017 (JP) .............................. JP2017-157820

(51) Int. Cl.
*G01N 25/72* (2006.01)
*B60W 40/068* (2012.01)
(Continued)

(52) U.S. Cl.
CPC ........ *B60W 40/068* (2013.01); *B60W 60/001* (2020.02); *G01C 21/3697* (2013.01);
(Continued)

(58) Field of Classification Search
CPC ... B60W 60/0023; B60K 28/06; G01N 19/02; G01N 33/42; G01N 25/72;
(Continued)

(56) References Cited

U.S. PATENT DOCUMENTS

| 2010/0019151 A1* | 1/2010 | Shimizu | ................. H04N 5/359 250/330 |
| 2012/0218411 A1* | 8/2012 | Wu | ......................... G01N 33/42 348/148 |

(Continued)

FOREIGN PATENT DOCUMENTS

| CN | 101363737 A | 2/2009 |
| CN | 103164962 A | 6/2013 |

(Continued)

OTHER PUBLICATIONS

International Search Report and Written Opinion dated Sep. 18, 2018 for PCT/JP2018/026525 filed on Jul. 13, 2018, 8 pages including English Translation of the International Search Report.
(Continued)

*Primary Examiner* — Yuri Kan
(74) *Attorney, Agent, or Firm* — Xsensus LLP

(57) ABSTRACT

An image captured by a far-infrared camera is analyzed to analyze a distribution of a road-surface temperature, and a course of a highest road-surface temperature is determined to be a traveling route. Further, automatic driving along the course of the highest road-surface temperature is performed. Furthermore, a state of the distribution of a road-surface temperature, and a direction of the course of the highest road-surface temperature are displayed on a display section, so that a user (a driver) recognizes them. For example, a state analyzer detects a candidate course travelable for a vehicle, the state analyzer detecting a plurality of the candidate courses, calculates an average value of a road-surface temperature of each of the plurality of the candidate courses,
(Continued)

and determines the candidate course having a largest average value of a road-surface temperature to be a traveling route.

19 Claims, 11 Drawing Sheets

(51) Int. Cl.
  *B60W 60/00* (2020.01)
  *G01C 21/36* (2006.01)
  *G01J 5/10* (2006.01)
  *G01J 5/00* (2022.01)

(52) U.S. Cl.
  CPC ............ *G01J 5/10* (2013.01); *B60W 2420/40* (2013.01); *B60W 2420/42* (2013.01); *B60W 2520/10* (2013.01); *B60W 2552/40* (2020.02); *B60W 2554/00* (2020.02); *G01J 2005/0077* (2013.01); *G01J 2005/0085* (2013.01)

(58) Field of Classification Search
  CPC ............ G06K 9/00805; G08G 1/0112; G08G 1/0133; H04N 5/359; B05B 1/14; G05D 1/0246
  See application file for complete search history.

(56) References Cited

U.S. PATENT DOCUMENTS

| | | | | |
|---|---|---|---|---|
| 2013/0235202 A1* | 9/2013 | Nagaoka | ............ | G06K 9/00805 348/148 |
| 2014/0062725 A1* | 3/2014 | Maston | ................ | G08G 1/0112 340/905 |
| 2015/0035962 A1* | 2/2015 | Nagaoka | ............ | G06K 9/00805 348/77 |
| 2015/0344037 A1* | 12/2015 | Siegel | ..................... | G01N 19/02 73/9 |
| 2018/0116579 A1* | 5/2018 | Omi | ........................ | B60K 28/06 |

FOREIGN PATENT DOCUMENTS

| | | | | | |
|---|---|---|---|---|---|
| CN | 203364978 | U | | 12/2013 | |
| CN | 105252973 | A | | 1/2016 | |
| DE | 102013179 | A1 | | 6/2015 | |
| EP | 2765046 | A1 | * | 8/2014 | ........ B60W 30/0956 |
| JP | 05-016623 | A | | 1/1993 | |
| JP | 2003176519 | A | * | 6/2003 | ............... B05B 1/14 |
| JP | 2010-115100 | A | | 5/2010 | |
| JP | 2010-163131 | A | | 7/2010 | |
| JP | 2012-101762 | A | | 5/2012 | |
| JP | 2012-230067 | A | | 11/2012 | |
| JP | 103413441 | A | | 11/2013 | |
| JP | 2016-075503 | A | | 5/2016 | |
| JP | 2016-162172 | | | 9/2016 | |
| JP | 2016-162172 | A | | 9/2016 | |

OTHER PUBLICATIONS

"Road surface area detection from in-vehicle camera image by Random Forest," 24 pages.

Yohei Mishina, et al., "Road surface area detection from in-vehicle camera image by Random Forest," 19th Symposium on Sensing via Imaging Information, Yokohama, Jun. 2013, 24 pages.

\* cited by examiner

VEHICLE TRAVELING CONTROL DEVICE, VEHICLE TRAVELING CONTROL METHOD, AND PROGRAM

CROSS-REFERENCE TO RELATED APPLICATIONS

The present application is based on PCT filing PCT/JP2018/026525, filed Jul. 13, 2018, which claims priority to JP 2017-157820, filed Aug. 18, 2017, the entire contents of each are incorporated herein by reference.

TECHNICAL FIELD

The present disclosure relates to a vehicle traveling control device, a vehicle traveling control method, and a program. In particular, the present disclosure relates to a vehicle traveling control device, a vehicle traveling control method, and a program that achieve an improvement in fuel efficiency when a vehicle is traveling.

BACKGROUND ART

It is known that there is a correlation between a tire temperature and fuel efficiency when an automobile is traveling.

For example, Patent Literature 1 (Japanese Patent Application Laid-open No. 2016-075503) discloses an evaluation device that measures a relationship between a temperature and a rolling resistance of a tire.

Further, Patent Literature 2 (Japanese Patent Application Laid-open No. 2012-101762) discloses a device that calculates a rolling resistance of a tire using a tire temperature detected by detection means provided in a vehicle, calculates energy consumption using a travel distance of an automobile on a route from a departure point to a destination, and the calculated rolling distance, and presents the calculated energy consumption to a driver.

CITATION LIST

Patent Literature

Patent Literature 1: Japanese Patent Application Laid-open No. 2016-075503
Patent Literature 2: Japanese Patent Application Laid-open No. 2012-101762

Non-Patent Literature

Non-Patent Literature 1:
http://www.vision.cs.chubu.ac.jp/MPRG/f_group/f133_mishina2013.pdf

DISCLOSURE OF INVENTION

Technical Problem

The technologies disclosed in the two patent literatures described above both measure a temperature of a tire itself and estimate a rolling resistance and the fuel efficiency from the temperature of the tire.

However, no other patent literatures including the patent literatures described above disclose measuring a road temperature, estimating the fuel efficiency, and controlling a vehicle.

It is conceivable that the tire temperature is greatly affected by a temperature of a road surface during traveling and is changed according to the temperature of a road, and the fuel efficiency varies due to the change in the tire temperature.

An object of the present disclosure is to provide a vehicle traveling control device, a vehicle traveling control method, and a program that achieve a vehicle traveling control with improved fuel efficiency, the vehicle traveling control including measuring a distribution of a temperature of a road in a travel direction of a traveling vehicle, estimating a traveling route with less fuel consumption, and controlling a vehicle traveling route.

Solution to Problem

A vehicle traveling control device according to a first aspect of the present disclosure includes
a detector that analyzes an image captured by a far-infrared camera to analyze a distribution of a road-surface temperature; and
a state analyzer that determines a course of a highest road-surface temperature to be a traveling route, using the distribution of a road-surface temperature.

Further, a vehicle traveling control method according to a second aspect of the present disclosure is performed in a vehicle traveling control device, and includes
performing, by a detector, detection including analyzing an image captured by a far-infrared camera to analyze a distribution of a road-surface temperature; and
performing, by a state analyzer, a state analysis including determining a course of a highest road-surface temperature to be a traveling route, using the distribution of a road-surface temperature.

Furthermore, a program according to a third aspect of the present disclosure causes a vehicle traveling control device to perform a vehicle traveling control, the vehicle traveling control including
performing detection including causing a detector to analyze an image captured by a far-infrared camera to analyze a distribution of a road-surface temperature; and
performing a state analysis including causing a state analyzer to determine a course of a highest road-surface temperature to be a traveling route, using the distribution of a road-surface temperature.

Note that the program of the present disclosure is, for example, a program that can be provided to an information processing device or a computer system by a recording medium or a communication medium, the information processing device or the computer system being capable of executing various program codes, the recording medium or the communication medium providing a program in a computer-readable form. By such a program being provided in a computer-readable form, a process depending on a program is performed on an information processing device or a computer system.

The other objects, features, and advantages of the present disclosure will be apparent from more detailed descriptions based on embodiments of the present disclosure described later and the appended drawings. Note that a system herein is a logical collection of a plurality of devices, and is not limited to having a configuration in which each included device is situated in a single housing.

Advantageous Effects of Invention

The configuration of an embodiment of the present disclosure makes it possible to travel while detecting a road-surface temperature and selecting a region of a high road-surface temperature, and thus to travel with improved fuel efficiency.

Specifically, for example, an image captured by a far-infrared camera is analyzed to analyze a distribution of a road-surface temperature, and a course of a highest road-surface temperature is determined to be a traveling route. Further, automatic driving along the course of the highest road-surface temperature is performed. Furthermore, a state of the distribution of a road-surface temperature, and a direction of the course of the highest road-surface temperature are displayed on a display section, so that a user (a driver) recognizes them. For example, a state analyzer detects a candidate course travelable for a vehicle, the state analyzer detecting a plurality of the candidate courses, calculates an average value of a road-surface temperature of each of the plurality of the candidate courses, and determines the candidate course having a largest average value of a road-surface temperature to be a traveling route.

This configuration makes it possible to travel while detecting a road-surface temperature and selecting a region of a high road-surface temperature, and thus to travel with improved fuel efficiency.

Note that the effect disclosed herein is merely illustrative but is not limitative, and any additional effect may be provided.

MODE(S) FOR CARRYING OUT THE INVENTION

A vehicle traveling control device, a vehicle traveling control method, and a program will now be described in detail with reference to the drawings. Note that the descriptions are made in accordance with the following items.

1. Outline of Process Performed by Vehicle Traveling Control Device
2. Example of Configuration of Vehicle Traveling Control Device
3. Sequence of Process Performed by Vehicle Traveling Control Device
4. Summary of Configuration of Present Disclosure 1. Outline of Process Performed by Vehicle Traveling Control Device First, an outline of a process performed by the vehicle traveling control device of the present disclosure is described with reference to FIG. 1 and figures subsequent to FIG. 1.

Figure 1:
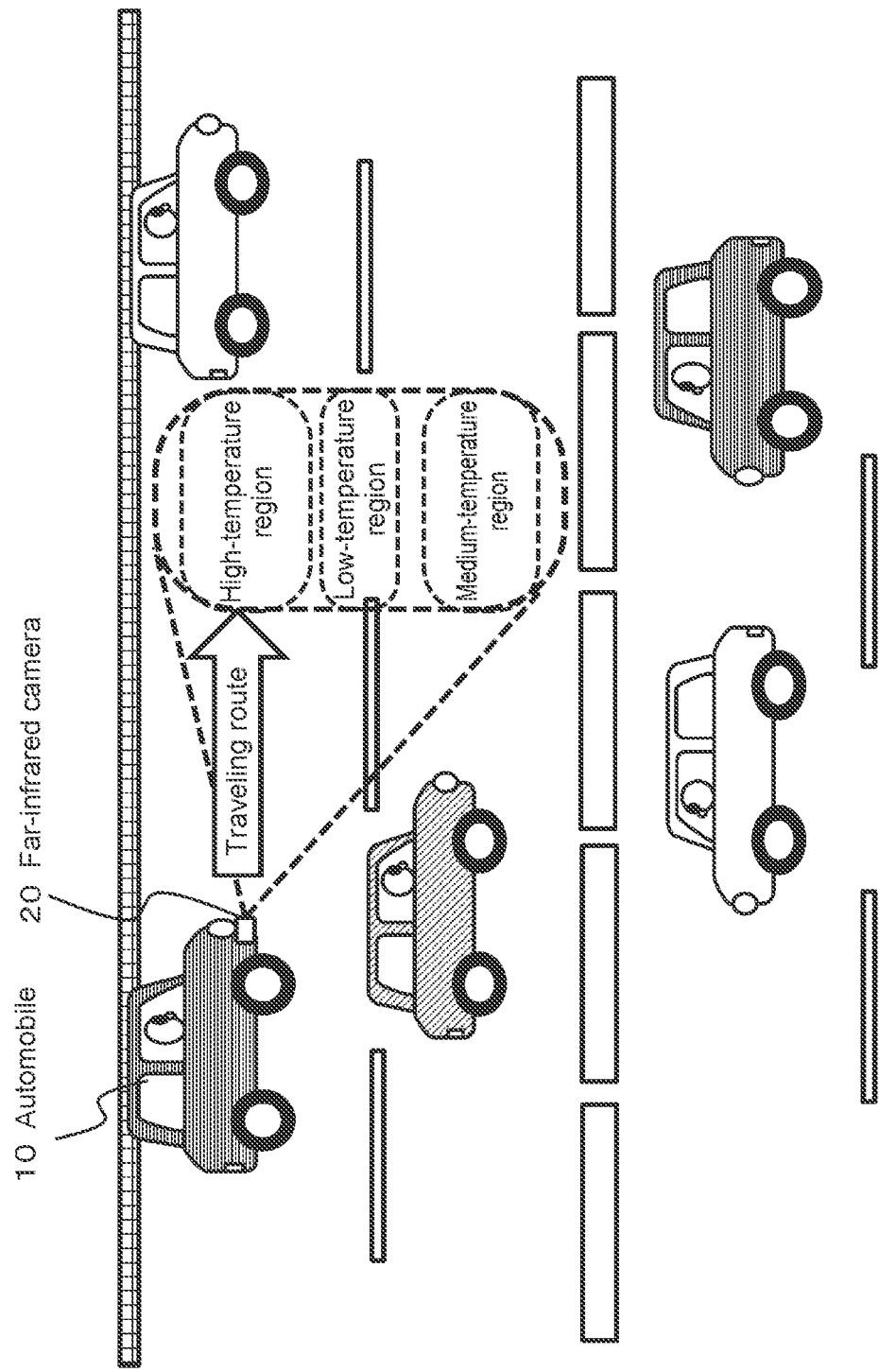
FIG. 1 illustrates an outline of a process performed by a vehicle traveling control device of the present disclosure.

FIG. 1 illustrates an example of a process performed by the vehicle traveling control device of the present disclosure.

The vehicle traveling control device of the present disclosure is provided in an automobile 10 illustrated in FIG. 1. A far-infrared camera 20 is provided in a front portion of the automobile 10, and captures a far-infrared image of a front region situated in a travel direction of the automobile 10.

The far-infrared camera 20 is a camera that captures an image of far-infrared radiation having a longer wavelength from among infrared radiation.

More infrared radiation is emitted from an object of a higher temperature. Thus, infrared radiation makes it possible to, for example, detect a high-temperature object such as a human being in, for example, the darkness, and is often used in, for example, a surveillance camera.

From among infrared radiation, far-infrared radiation is more highly sensitive to heat, so it is possible to find out a high-temperature portion and a low-temperature portion using a far-infrared image.

The far-infrared image is, for example, a light-and-shade image depending on a temperature distribution. Specifically, it is a monochrome image that becomes whiter with a higher temperature, in which, for example, a high-temperature portion is represented in white and a low-temperature portion is represented in black.

Figure 2:
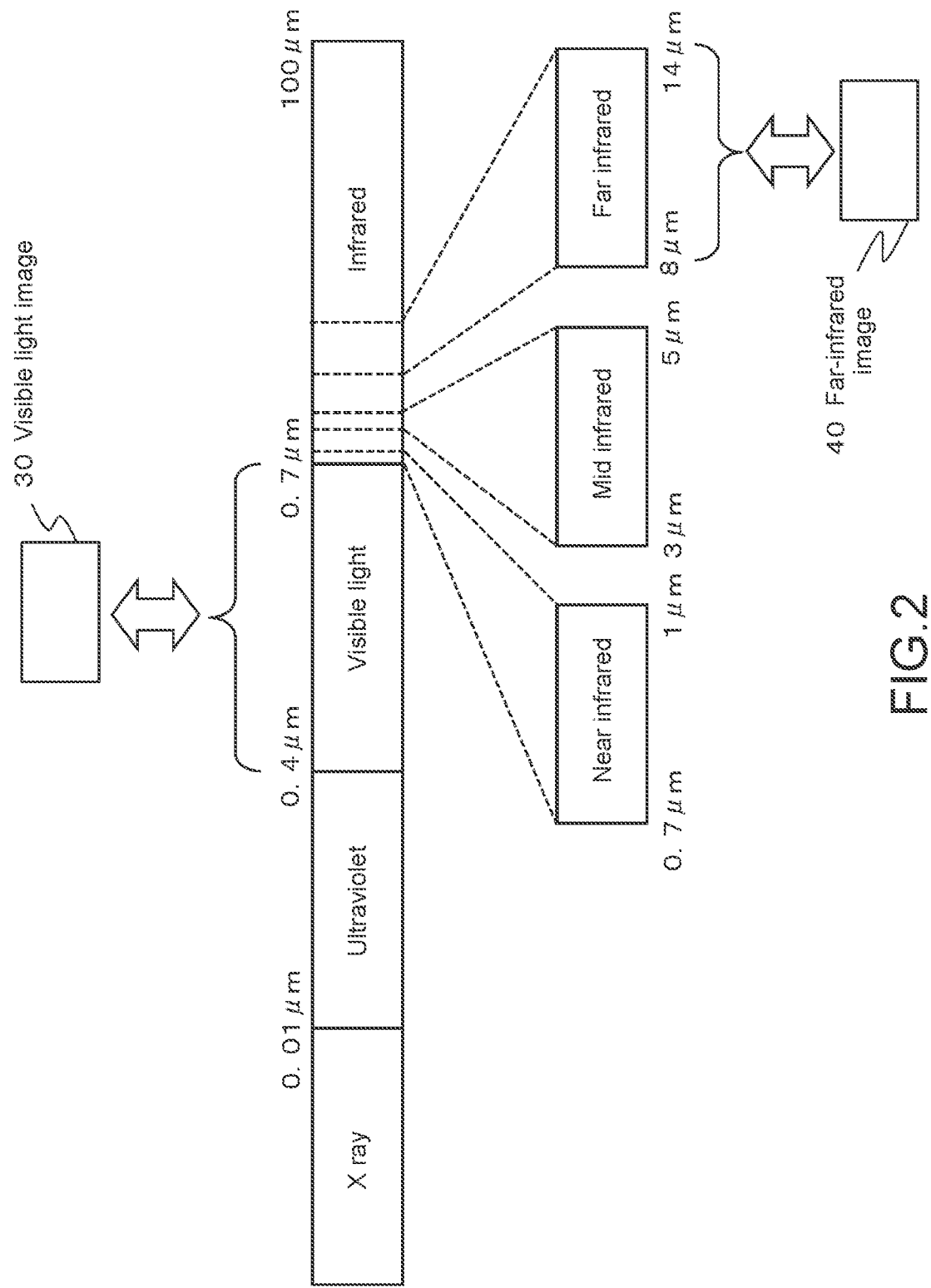
FIG. 2 is a diagram explaining a visible light image and a far-infrared image.

An example of a wavelength of which an image is captured as a visible light image or a far-infrared image, is described, with reference to FIG. 2.

As illustrated in FIG. 2, a visible light image 30 is an image in which the wavelength is in a range of about 0.4 μm to 0.7 μm, and is a color image such as an RGB image that is captured using a commonly used camera.

The infrared light image is an image of light of a long wavelength in which the wavelength is 0.7 μm or more. An infrared-light-image capturing camera that captures an infrared-light image is capable of capturing an image of an object that produces heat, such as a human being, as described above, and is used in, for example, a surveillance camera.

As illustrated in FIG. 2, infrared radiation is classified as below:
near-infrared radiation in which the wavelength is about 0.7 to 1 μm,
mid-infrared radiation in which the wavelength is about 3 to 5 μm, and
far-infrared radiation in which the wavelength is about 8 to 14 μm.

As described above, far-infrared radiation is highly sensitive to heat, so it is possible to easily find out a high-temperature portion and a low-temperature portion using a far-infrared image.

In embodiments described below, an example of image processing performed using a far-infrared image 40 obtained by performing image-capturing on far-infrared radiation in which the wavelength is primarily about 8 to 14 μm, is described.

However, the processing of the present disclosure is not limited to being performed using a far-infrared image, and other infrared light images can also be used.

Referring back to FIG. 1, an example of a process performed by the vehicle traveling control device of the present disclosure is described.

The far-infrared camera 20 provided in the front portion of the automobile 10 illustrated in FIG. 1 continuously captures a far-infrared image of a preceding road in the travel direction of the automobile 10.

As described above, the analysis of a far-infrared image of a subject that is captured by the far-infrared camera 20 makes it possible to analyze a distribution of a temperature of the subject of the captured image.

The vehicle traveling control device of the present disclosure analyzes a far-infrared image of a road that is captured by the far-infrared camera 20, so as to analyze a distribution of a temperature of the road of the captured image.

For example, the automobile 10 is traveling in a left lane on a two-lane road, as illustrated in FIG. 1.

The far-infrared camera 20 consecutively captures a far-infrared image of the entirety of a portion of the road in width that is travelable for the automobile 10, from the left lane to a right lane. For example, the far-infrared camera 20 captures far-infrared images as a moving image.

The vehicle traveling control device analyzes a far-infrared image of the road that is captured by the far-infrared camera 20, and, for example, as illustrated in FIG. 1, the vehicle traveling control device analyzes a distribution of a temperature of the road of the captured image.

For example, the analysis result illustrated in FIG. 1 can be obtained. In other words, a distribution of a temperature of the road for each region can be obtained as indicated below, as illustrated in FIG. 1:

the left-lane region in which the automobile 10 is traveling, is a high-temperature region, the middle region between the left lane and the right lane (lane-indicating-line region) is a low-temperature region, and the right lane is a medium-temperature region.

Using the temperature analysis result, the vehicle traveling control device determines a route of a highest road-surface temperature to be a route providing the best fuel efficiency, and thus to be a traveling route. The vehicle traveling control device controls traveling of the automobile 10 according to the determined traveling route.

Note that FIG. 1 illustrates an example of an automobile automatically steered in an automatic driving mode.

In the example illustrated in FIG. 1, the left-lane region in which the automobile 10 is now traveling is a high-temperature region. The tire temperature is kept at a high temperature by the automobile 10 keeping on traveling in the left-lane region, and thus it becomes possible to travel with a reduced rolling resistance. This results in being able to travel with good fuel efficiency.

Figure 3:
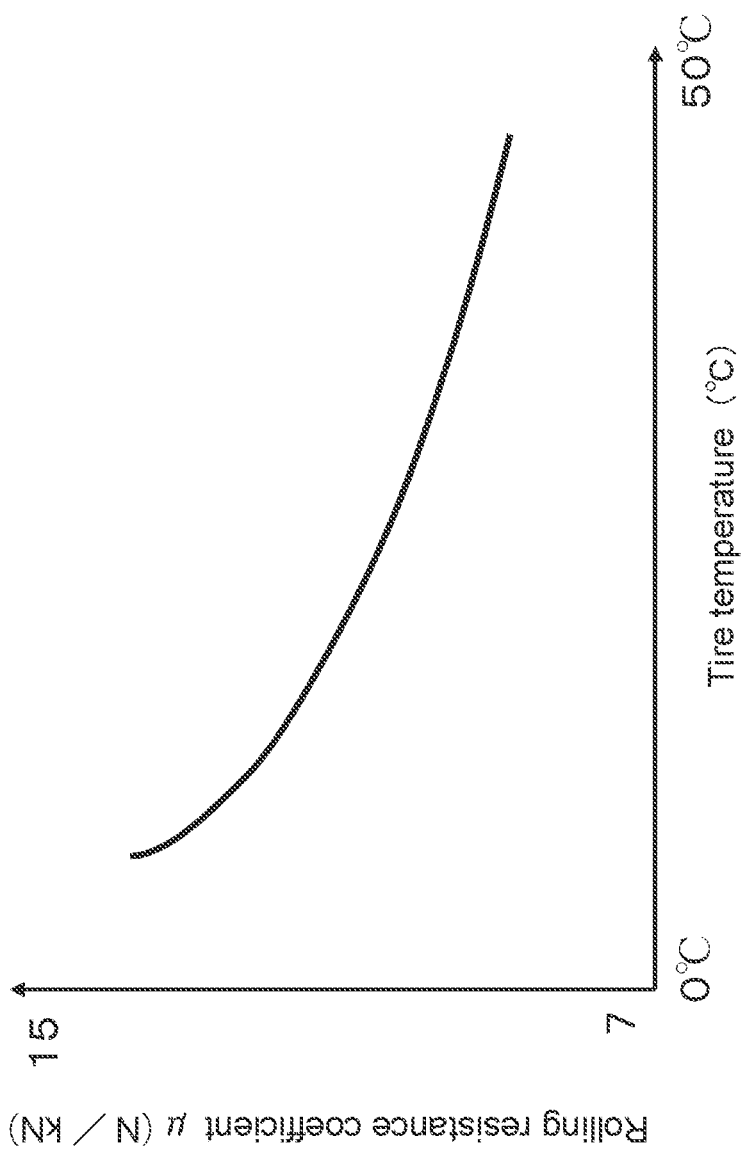
FIG. 3 is a graph illustrating a correspondence relationship between a tire temperature and a rolling resistance coefficient.

Note that a relationship between a tire temperature and a coefficient of a rolling resistance of the tire is already known, and, for example, there is a relationship that follows the graph illustrated in FIG. 3.

FIG. 3 is a graph having a tire temperature on its horizontal axis and a coefficient (μ) of a rolling resistance of the tire on its vertical axis.

As can be seen from the graph illustrated in FIG. 3, the rolling resistance coefficient (μ) is smaller if the tire temperature is higher.

The rolling resistance (R) of a tire can be calculated using a formula indicated below (Formula 1) by use of the rolling resistance coefficient (μ).

$$R = \mu mg \qquad \text{(Formula 1)}$$

Note that, in Formula 1 described above, μ represents a coefficient of a rolling resistance of a tire, m represents a vehicle weight, and g represents gravitational acceleration.

As can be seen from Formula 1 described above, the rolling resistance (R) of a tire is smaller if the rolling resistance coefficient (μ) is smaller.

Further, as indicated by the graph illustrated in FIG. 3, the coefficient (μ) of a rolling resistance is smaller if the temperature is higher. Thus, in an automobile, it is possible to make the rolling resistance (R) of a tire smaller if the tire temperature is higher, which results in being able to travel with good fuel efficiency.

In the example illustrated in FIG. 1, the road surface of the left-lane region in which the automobile 10 is now traveling is a high-temperature region. The tire temperature is kept at a high temperature by the automobile 10 keeping on traveling in the left-lane region, and thus it becomes possible to travel with a reduced rolling resistance. This results in achieving traveling with good fuel efficiency.

Using the temperature analysis result, the vehicle traveling control device determines that the left-lane region is a high-temperature region and thus is a route providing the best fuel efficiency, selects the left lane to be a traveling route, and controls traveling of the automobile 10 in accordance with a result of the selection, such that the automobile 10 is set in the left lane.

Note that capturing of a far-infrared image performed by the far-infrared camera 20, and an analysis of a distribution of a temperature of a road surface for each region are continuously performed.

Thus, a result of analyzing a temperature distribution using a captured far-infrared image is also successively updated.

Figure 4:
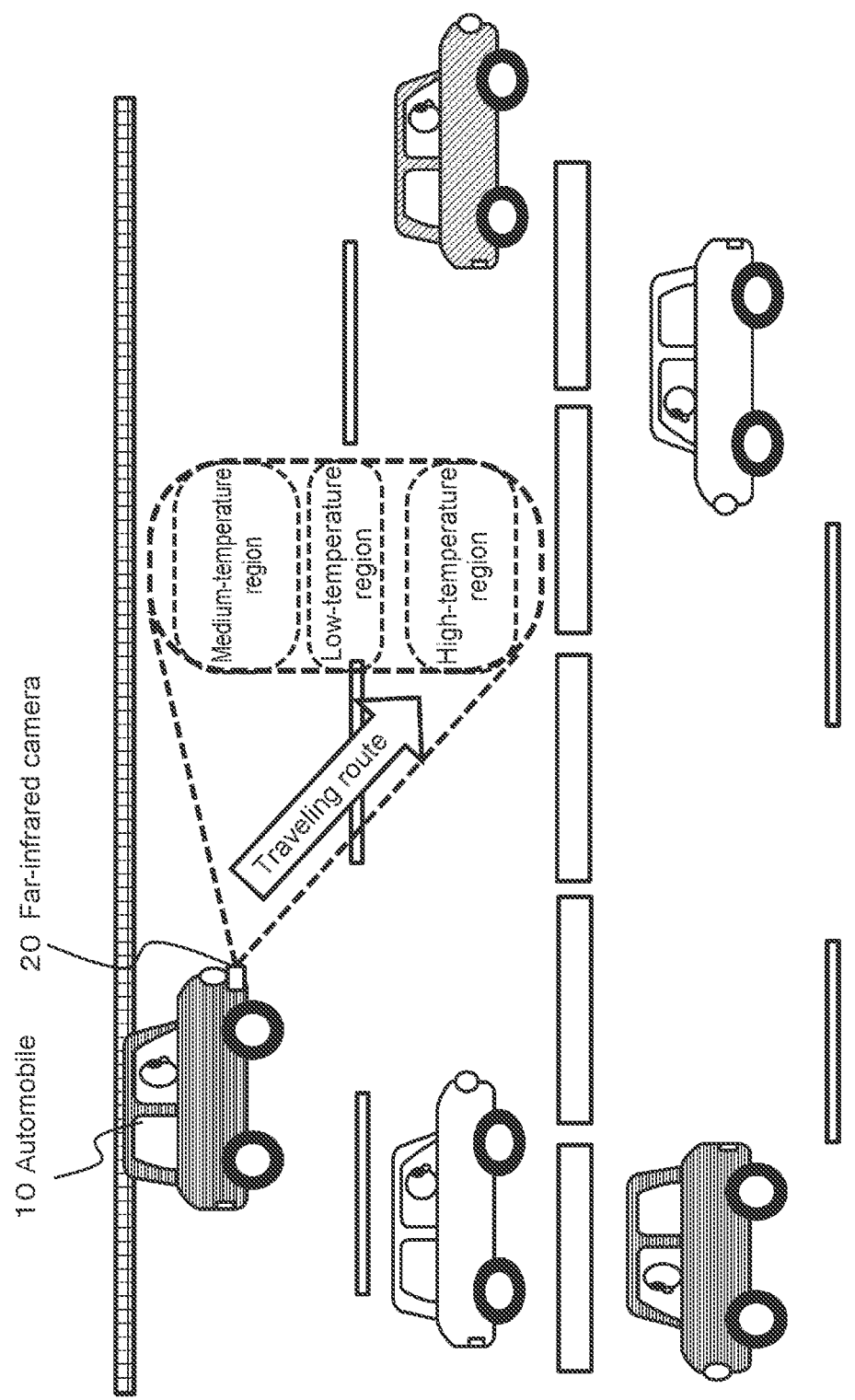
FIG. 4 illustrates an outline of a process performed by the vehicle traveling control device of the present disclosure.

For example, it is assumed that the result of analyzing a temperature distribution using a far-infrared image is changed to the state illustrated in FIG. 4 while the automobile 10 is traveling in the left lane according to the temperature analysis result illustrated in FIG. 1.

FIG. 4 illustrates an example of the result of analyzing a temperature distribution using a far-infrared image, where the left-lane region in which the automobile 10 is traveling, is a medium-temperature region, the middle region between the left lane and the right lane (lane-indicating-line region) is a low-temperature region, and the right lane is a high-temperature region.

When the temperature distribution for each road region illustrated in FIG. 4 is obtained as a result of analyzing a temperature distribution using a far-infrared image, the vehicle traveling control device of the automobile 10 performs a process including:

determining, using the temperature analysis result, that a region of the right lane is a high-temperature region and thus is a route providing the best fuel efficiency; selecting the right lane to be a traveling route; and performing a traveling control to move the automobile 10 to the right lane in accordance with a result of the selection.

Note that a lane change is made after distances to vehicles traveling ahead and behind are checked to confirm that there are safe distances between vehicles.

The configuration described in reference to FIGS. 1 and 4 is an example of providing the vehicle traveling control device of the present disclosure in an automobile that is capable of traveling in an automatic driving mode.

The vehicle traveling control device of the present disclosure can be provided not only in such an automobile that is capable of traveling in an automatic driving mode, but also in an automobile that does not include a function of an automatic driving mode.

An example of a process performed by the vehicle traveling control device of the present disclosure when the vehicle traveling control device is provided in an automobile that does not include a function of an automatic driving mode, is described with reference to FIG. 5.

Figure 5:
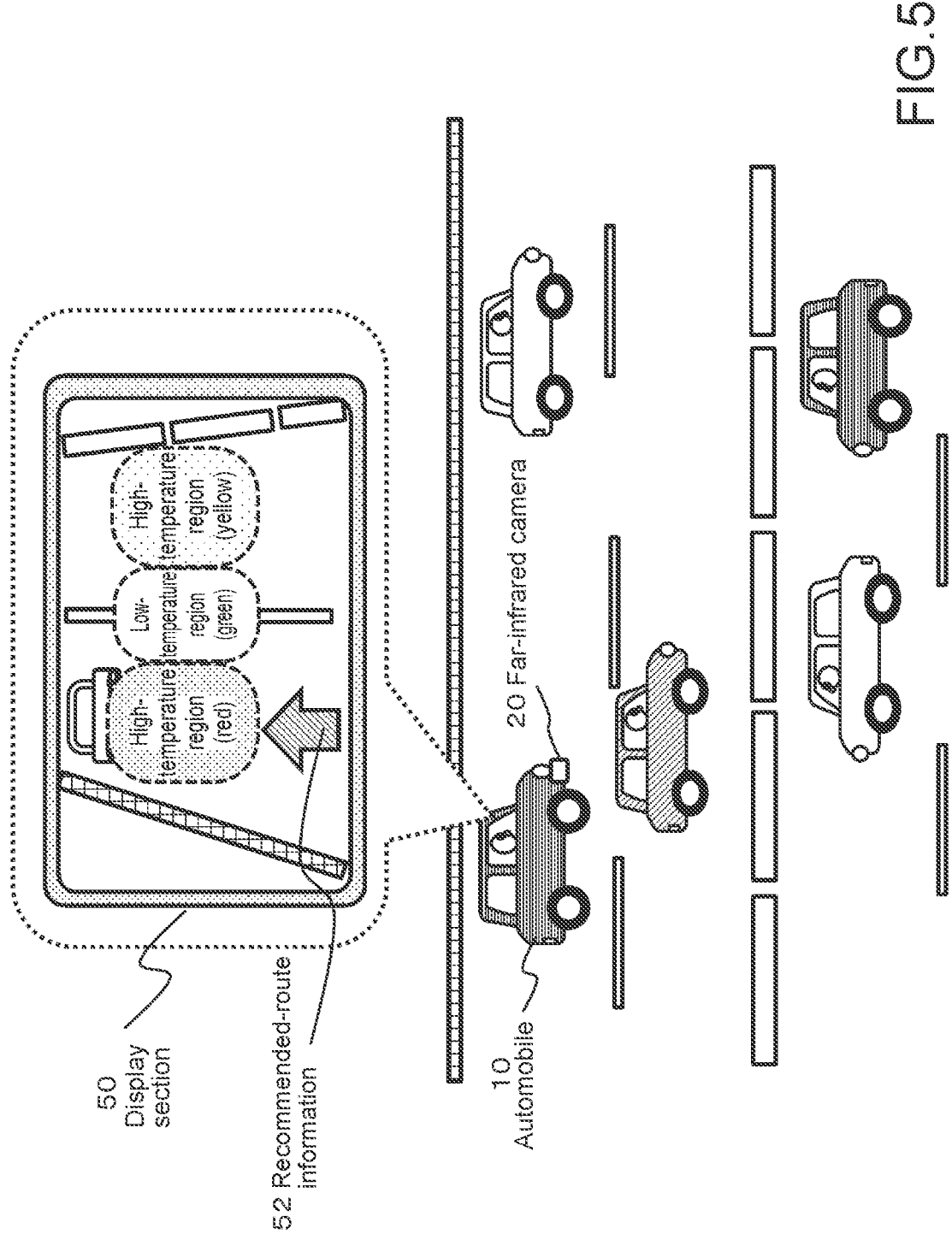
FIG. 5 illustrates an outline of a process performed by the vehicle traveling control device of the present disclosure.

FIG. 5 illustrates an example of a process performed by the vehicle traveling control device of the present disclosure, as in the case of FIG. 1.

The vehicle traveling control device of the present disclosure is provided in the automobile 10 illustrated in FIG. 5. The far-infrared camera 20 is provided in the front portion of the automobile 10, and captures a far-infrared image of a front region situated in the travel direction of the automobile 10.

The vehicle traveling control device provided in the automobile 10 analyzes a far-infrared image of a road that is captured by the far-infrared camera 20.

The vehicle traveling control device of the automobile 10 illustrated in FIG. 5 displays a result of analyzing the far-infrared image on a display section 50 that is included in the automobile.

As illustrated in FIG. 5, the following information regarding a temperature distribution for each road region is displayed on the display section 50:

the left-lane region in which the automobile 10 is traveling, is a high-temperature region, the middle region between the left lane and the right lane (lane-indicating-line region) is a low-temperature region, and the right lane is a medium-temperature region.

The vehicle traveling control device of the automobile 10 illustrated in FIG. 5 acquires such information regarding a temperature distribution for each road region, and displays the acquired information on the display section 50.

Note that an output color depending on a temperature may be set to perform display on the display section 50.

As illustrated in FIG. 5, the high-temperature region that is the left-lane region in which the automobile 10 is traveling, is output in a red-color setting, the low-temperature region that is the middle region between the left lane and the right lane (lane-indicating-line region), is output in a green-color setting, and the medium-temperature region that is the right lane is output in a yellow-color setting.

Such color-coding upon performing outputting enables a user (a driver) to know a road-surface temperature immediately.

The vehicle traveling control device of the automobile 10 illustrated in FIG. 5 further selects, using the temperature analysis result, a route providing the best fuel efficiency to be a traveling route, and displays recommended-route information 52 on the display section 50 of the automobile 10 in accordance with a result of the selection.

In the example illustrated in the figure, the left-lane region in which the automobile 10 is traveling, is a high-temperature region, and an arrow that indicates a travel direction in the left lane is displayed as the recommended-route information 52.

A driver of the automobile 10 can select a high-temperature region of a road to travel on the high-temperature region, by steering the automobile 10 in accordance with the information displayed on the display section 50, that is, the recommended-route information 52.

Such a traveling process makes it possible to travel with good fuel efficiency.

Note that, also with respect to the automobile including a function of an automatic driving mode described with reference to FIGS. 1 and 4, a setting may be performed such that a state of a distribution of a road temperature and recommended-route information similar to those illustrated in FIG. 5, are displayed on a display section of the automobile while selecting a high-temperature region of the road and performing automatic driving.

The display of information while performing automatic driving enables a driver to know, in advance, that an automobile travels along a recommended route displayed on a display section, and to know, in advance, that there may be a change in, for example, a lane for traveling.

2. Example of Configuration of Vehicle Traveling Control Device

Next, an example of a configuration of the vehicle traveling control device is described with reference to FIG. 6.

Figure 6:
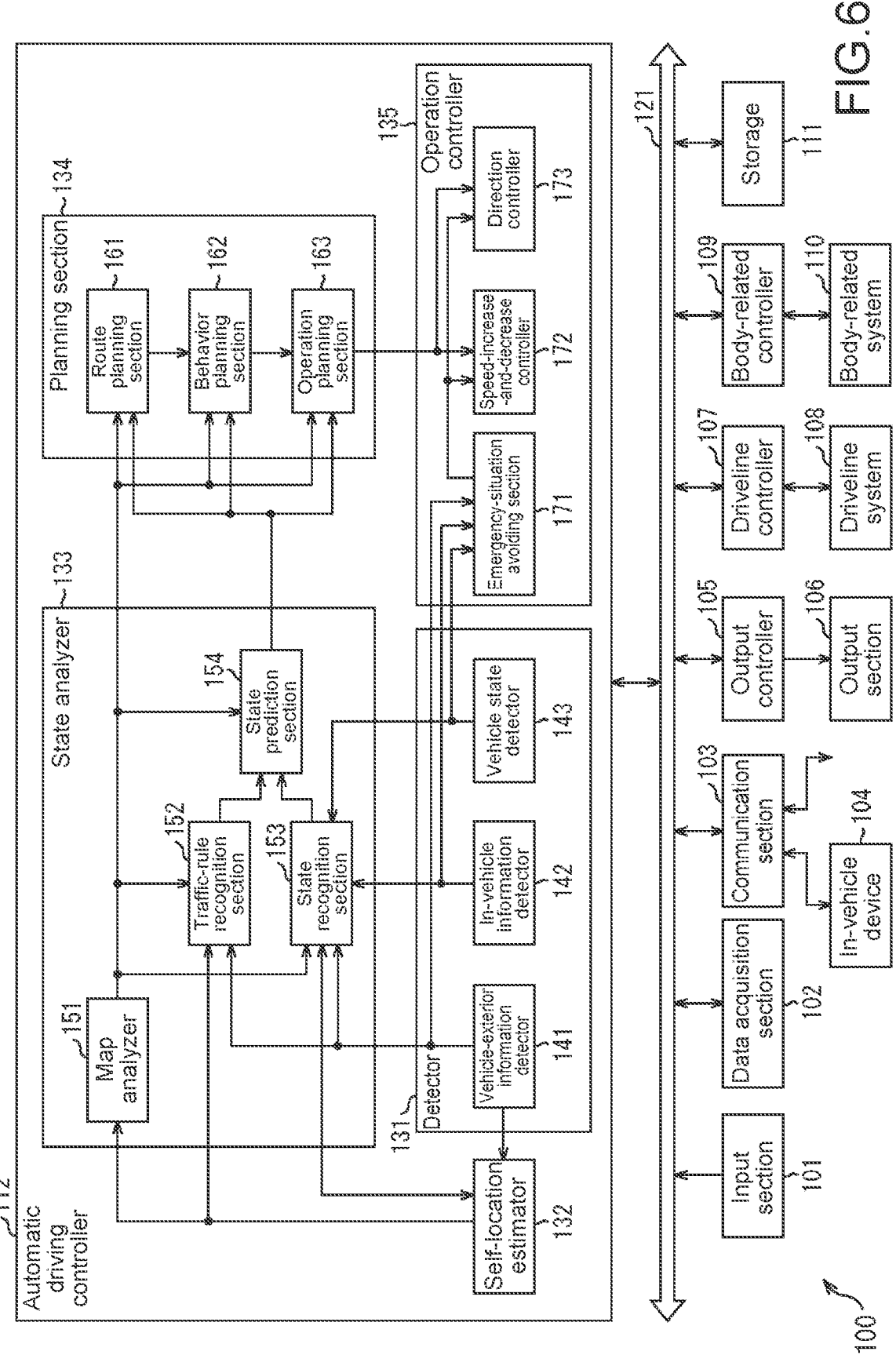
FIG. 6 is a diagram of an example of a configuration of the vehicle traveling control device of the present disclosure.

FIG. 6 is a block diagram of an example of a schematic functional configuration of a vehicle control system 100 that is an example of the vehicle traveling control device that is included in the automobile 10 and performs the process described above.

Note that, when a vehicle provided with the vehicle control system 100 is to be distinguished from other vehicles, it will be hereinafter referred to as a system-installed automobile or a system-installed vehicle.

The vehicle control system 100 includes an input section 101, a data acquisition section 102, a communication section 103, an in-vehicle device 104, an output controller 105, an output section 106, a driveline controller 107, a driveline system 108, a body-related controller 109, a body-related system 110, a storage 111, and an automatic driving controller 112. The input section 101, the data acquisition section 102, the communication section 103, the output controller 105, the driveline controller 107, the body-related controller 109, the storage 111, and the automatic driving controller 112 are connected to one another through a communication network 121. Examples of the communication network 121 include an onboard communication network and a bus that meet any standard such as a controller area network (CAN), a local interconnect network (LIN), a local area network (LAN), and FlexRay (registered trademark). Note that the respective components of the vehicle control system 100 may also be directly connected to one another without the communication network 121.

Note that the description of the communication network 121 will be omitted below when the respective components of the vehicle control system 100 communicate with one another through the communication network 121. For example, when the input section 101 and the automatic driving controller 112 communicate with each other through the communication network 121, it will be simply stated that the input section 101 and the automatic driving controller 112 communicate with each other.

The input section 101 includes a device used by a person on board to input, for example, various data and instructions. For example, the input section 101 includes a manipulation device such as a touch panel, a button, microphones, a switch, and a lever, as well as a manipulation device on which input can be performed by a method other than a manual manipulation, such as sound or a gesture. Further, for example, the input section 101 may be an externally connected device such as a remote-control device that uses infrared or other radio waves, or a mobile device or a wearable device that can deal with manipulating the vehicle control system 100. The input section 101 generates an input signal according to data or an instruction input by a person on board, and provides the input signal to each component of the vehicle control system 100.

The data acquisition section 102 includes, for example, various sensors that acquire data used for a process performed by the vehicle control system 100, and provides the acquired data to each component of the vehicle control system 100.

For example, the data acquisition section 102 includes various sensors for detecting, for example, a state of the system-installed automobile. Specifically, for example, the data acquisition section 102 includes, for example, a gyroscope, an acceleration sensor, an inertial measurement unit (IMU), and a sensor for detecting, for example, an amount of operating a gas pedal, an amount of operating a brake pedal, a steering angle for a steering wheel, the number of engine rotation, the number of motor rotation, or a speed of wheel rotation.

Further, for example, the data acquisition section 102 includes various sensors for detecting information regarding the outside of the system-installed automobile. Specifically, for example, the data acquisition section 102 includes an image-capturing device such as a time-of-flight (ToF) camera, a visible light camera, a stereo camera, a monocular camera, a (far-)infrared camera, and other cameras. Furthermore, for example, the data acquisition section 102 includes an environment sensor for detecting, for example, weather or a weather condition, and a surroundings-information detection sensor for detecting an object around the system-installed automobile. Examples of the environment sensor include a raindrop sensor, a fog sensor, a sunlight sensor, and a snow sensor. Examples of the surroundings-information detection sensor include an ultrasonic sensor, a radar, LiDAR (light detection and ranging, laser imaging detection and ranging), and a sonar.

Moreover, for example, the data acquisition section 102 includes various sensors for detecting a current location of the system-installed automobile. Specifically, for example, the data acquisition section 102 includes, for example, a global navigation satellite system (GNSS) receiver that receives a GNSS signal from a GNSS satellite.

Further, for example, the data acquisition section 102 includes various sensors for detecting in-vehicle information. Specifically, for example, the data acquisition section 102 includes, for example, an image-capturing device that captures an image of a driver, a biological sensor that detects biological information regarding a driver, and microphones that collect sound inside a vehicle. The biological sensor is provided in, for example, a seating surface or a steering wheel, and detects biological information regarding a person on board who is sitting on a seat, or a driver behind the steering wheel.

The communication section 103 communicates with the in-vehicle device 104 as well as various vehicle-exterior devices, servers, base stations, and the like, and transmits data provided by each component of the vehicle control system 100 and provides received data to each component of the vehicle control system 100. Note that the communication protocol supported by the communication section 103 is not particularly limited, and the communication section 103 may also support a plurality of types of communication protocols.

For example, the communication section 103 wirelessly communicates with the in-vehicle device 104 using, for example, a wireless LAN, Bluetooth (registered trademark), near field communication (NFC), or a wireless USB (WUSB). Further, for example, the communication section 103 communicates with the in-vehicle device 104 by wire using, for example, a universal serial bus (USB), a high-definition multimedia interface (HDMI) (registered trademark), or a mobile high-definition link (MHL) through a connection terminal (not illustrated) (and a cable if necessary).

Further, for example, the communication section 103 communicates with a device (such as an application server or a control server) situated in an external network (such as the Internet, a cloud network, or a carrier-specific network) through a base station or an access point. Furthermore, for example, the communication section 103 communicates with a terminal situated near the system-installed automobile (such as a terminal of a pedestrian or a store, or a machine-type-communication (MTC) terminal), using a peer to peer (P2P) technology. Moreover, for example, the communication section 103 performs a V2X communication such as a vehicle-to-vehicle communication, a vehicle-to-infrastructure communication, a vehicle-to-home communication between the system-installed automobile and a home, and a vehicle-to-pedestrian communication. Further, for example, the communication section 103 includes a beacon receiver, receives a radio wave or an electromagnetic wave transmitted by, for example, a wireless station placed on a road, and acquires information regarding, for example, a current location, a traffic jam, a traffic regulation, or a necessary time.

Examples of the in-vehicle device 104 include a mobile device or a wearable device of a person on board, an information device that is brought in or provided in the system-installed automobile, and a navigation device that searches for a route to any destination.

The output controller 105 controls outputs of various pieces of information to a person on board of the system-installed automobile or to the outside of the system-installed automobile. For example, the output controller 105 controls outputs of visual information (such as image data) and auditory information (such as sound data) from the output section 106 by generating an output signal that includes at least one of the visual information or the auditory information and providing the output signal to the output section 106. Specifically, for example, the output controller 105 combines pieces of data of images respectively captured by different image-capturing devices of the data acquisition section 102, generates, for example, a long-shot image or a panoramic image, and provides an output signal that includes the generated image to the output section 106. Further, for example, the output controller 105 generates sound data that includes, for example, a warning beep or a warning message alerting a danger such as collision, contact, or an entry into a dangerous zone, and provides an output signal that includes the generated sound data to the output section 106.

The output section 106 includes a device that is capable of outputting visual information or auditory information to a person on board of the system-installed automobile or to the outside of the system-installed automobile. For example, the output section 106 includes, for example, a display device, an instrument panel, an audio speaker, headphones, a wearable device such as an eyeglass-style display that is used to be worn on a person on board, a projector, and a lamp. In addition to a display device that includes a commonly used display, the display device included in the output section 106 may be a device, such as a head-up display, a transmissive display, or a device including an augmented reality (AR) display function, that displays visual information in the field of view of a driver.

The driveline controller 107 controls the driveline system 108 by generating various control signals and providing them to the driveline system 108. Further, the driveline controller 107 provides a control signal to the respective components other than the driveline system 108 as necessary to, for example, report a state of controlling the driveline system 108.

The driveline system 108 includes various devices related to a driveline of the system-installed automobile. For example, the driveline system 108 includes, for example, a drive force generator, such as an internal-combustion engine and a driving motor, that generates a drive force, a drive force transmission mechanism for transmitting a drive force to wheels, a steering mechanism that performs rudder adjustment, a braking device that generates a braking force, an antilock brake system (ABS), an electronic stability control (ESC), and an electric power steering device.

The body-related controller 109 controls the body-related system 110 by generating various control signals and providing them to the body-related system 110. Further, the body-related controller 109 provides a control signal to the respective components other than the body-related system 110 as necessary to, for example, report a state of controlling the body-related system 110.

The body-related system 110 includes various body-related devices included in a vehicle body. For example, the body-related system 110 includes, for example, a keyless entry system, a smart key system, a power window device, a power seat, a steering wheel, an air conditioner, and various lamps (such as a headlamp, a back lamp, a stop lamp, a blinker, and a fog lamp).

The storage 111 includes, for example, a magnetic-storage device such as a read only memory (ROM), a random access memory (RAM), and a hard disc drive (HDD), a semiconductor storage device, an optical storage device, and a magneto-optical storage device. The storage 111 stores therein various programs and data used by the respective components of the vehicle control system 100. For example, the storage 111 stores therein map data such as a three-dimensional high-precision map such as a dynamic map, a global map that is less precise and covers a wider area than a high-precision map, and a local map that includes information regarding the surroundings of the system-installed automobile.

The automatic driving controller 112 performs a control related to automatic driving such as autonomous traveling and a driving assistance. Specifically, for example, the automatic driving controller 112 performs a cooperative control in order to provide a function of an advanced driver assistance system (ADAS) including, for example, collision avoidance or impact relaxation of the system-installed automobile, traveling after a leading vehicle based on a distance between vehicles, traveling while maintaining a vehicle speed, a warning of a collision of the system-installed automobile, or a warning of deviation of the system-installed automobile from a lane. Further, for example, the automatic driving controller 112 performs a cooperative control in order to achieve, for example, automatic driving that is to travel autonomously without an operation performed by a driver. The automatic driving controller 112 includes a detector 131, a self-location estimator 132, a state analyzer 133, a planning section 134, and an operation controller 135.

The detector 131 detects various pieces of information necessary to control automatic driving. The detector 131 includes a vehicle-exterior information detector 141, an in-vehicle information detector 142, and a vehicle state detector 143.

The vehicle-exterior information detector 141 performs a process of detecting information regarding the outside of the system-installed automobile using data or a signal from each component of the vehicle control system 100. For example, the vehicle-exterior information detector 141 performs processes of detecting, recognizing, and tracking an object around the system-installed automobile, and a process of detecting a distance to the object. Examples of the detection-target object include a vehicle, a human being, an obstacle, a structure, a road, a traffic light, a traffic sign, and a road sign. Further, for example, the vehicle-exterior information detector 141 performs a process of detecting an environment surrounding the system-installed automobile. Examples of the detection-target surrounding environment include weather, temperature, humidity, brightness, and a state of a road surface. The vehicle-exterior information detector 141 provides data indicating a result of the detection process to, for example, the self-location estimator 132, a map analyzer 151, a traffic-rule recognition section 152, and a state recognition section 153 of the state analyzer 133, as well as an emergency-situation avoiding section 171 of the operation controller 135.

The in-vehicle information detector 142 performs a process of detecting in-vehicle information using data or a signal from each component of the vehicle control system 100. For example, the in-vehicle information detector 142 performs processes of authenticating and recognizing a driver, a process of detecting a state of the driver, a process of detecting a person on board, and a process of detecting an in-vehicle environment. Examples of the detection-target state of a driver include a physical condition, a degree of arousal, a degree of concentration, a degree of tiredness, and a direction of a line of sight. Examples of the detection-target in-vehicle environment include temperature, humidity, brightness, and odor. The in-vehicle information detector 142 provides data indicating a result of the detection process to, for example, the state recognition section 153 of the state analyzer 133 and the emergency-situation avoiding section 171 of the operation controller 135.

The vehicle state detector 143 performs a process of detecting a state of the system-installed automobile using data or a signal from each component of the vehicle control system 100. Examples of the detection-target state of the system-installed automobile include a speed, acceleration, a rudder angle, the presence or absence of something unusual and its details, a state of driving maneuver, a position and an inclination of a power seat, a state of a door lock, and states of other onboard devices. The vehicle state detector 143 provides data indicating a result of the detection process to, for example, the state recognition section 153 of the state analyzer 133 and the emergency-situation avoiding section 171 of the operation controller 135.

The self-location estimator 132 performs a process of estimating, for example, the location and the pose of the system-installed automobile using data or a signal from the respective components of the vehicle control system 100, such as the vehicle-exterior information detector 141, and the state recognition section 153 of the state analyzer 133. Further, the self-location estimator 132 generates, as necessary, a local map used to estimate a self-location (hereinafter referred to as a self-location estimation map). The self-location estimation map is a high-precision map that uses a technology such as simultaneous localization and mapping (SLAM). The self-location estimator 132 provides data indicating a result of the estimation process to, for example, the map analyzer 151, the traffic-rule recognition section 152, and the state recognition section 153 of the state analyzer 133. Further, the self-location estimator 132 stores the self-location estimation map in the storage 111.

The state analyzer 133 performs a process of analyzing states of the system-installed automobile and its surroundings. The state analyzer 133 includes the map analyzer 151, the traffic-rule recognition section 152, the state recognition section 153, and a state prediction section 154.

The map analyzer 151 performs a process of analyzing various maps stored in the storage 111 using, as necessary, data or a signal from the respective components of the vehicle control system 100, such as the self-location estimator 132 and the vehicle-exterior information detector 141, and constructs a map that includes information necessary for a process of automatic driving. The map analyzer 151 provides the constructed map to, for example, the traffic-rule recognition section 152, the state recognition section 153, and the state prediction section 154, as well as a route planning section 161, a behavior planning section 162, and an operation planning section 163 of the planning section 134.

The traffic-rule recognition section 152 performs a process of recognizing traffic rules around the system-installed automobile using data or a signal from the respective components of the vehicle control system 100, such as the self-location estimator 132, the vehicle-exterior information detector 141, and the map analyzer 151. For example, a location and a state of a traffic light around the system-installed automobile, the details of a traffic control performed around the system-installed automobile, and a travelable lane are recognized by the recognition process being performed. The traffic-rule recognition section 152 provides data indicating a result of the recognition process to, for example, the state prediction section 154.

The state recognition section 153 performs a process of recognizing a state related to the system-installed automobile using data or a signal from the respective components of the vehicle control system 100, such as the self-location estimator 132, the vehicle-exterior information detector 141, the in-vehicle information detector 142, the vehicle state detector 143, and the map analyzer 151. For example, the state recognition section 153 performs a process of recognizing, for example, a state of the system-installed automobile, a state of the surroundings of the system-installed automobile, and a state of a driver of the system-installed automobile. Further, the state recognition section 153 generates, as necessary, a local map used to recognize a state of the surroundings of the system-installed automobile (hereinafter referred to as a state-recognition map). The state-recognition map is, for example, an occupancy grid map.

Examples of the recognition-target state of the system-installed automobile include a location, a pose, and a movement (such as a speed, acceleration, and a movement direction) of the system-installed automobile, as well as the presence or absence of something unusual and its details. Examples of the recognition-target state of the surroundings of the system-installed automobile include the type and a location of a stationary object around the system-installed automobile; the type, a location, and a movement (such as a speed, acceleration, and a movement direction) of a moving object around the system-installed automobile; a structure of a road around the system-installed automobile and a state of the surface of the road; and weather, temperature, humidity, and brightness around the system-installed automobile. Examples of the recognition-target state of a driver include a physical condition, a degree of arousal, a degree of concentration, a degree of tiredness, a movement of a line of sight, and driving maneuver.

The state recognition section 153 provides data indicating a result of the recognition process (that includes a state-recognition map as necessary) to, for example, the self-location estimator 132 and the state prediction section 154. Further, the state recognition section 153 stores the state-recognition map in the storage 111.

The state prediction section 154 performs a process of predicting a state related to the system-installed automobile using data or a signal from the respective components of the vehicle control system 100, such as the map analyzer 151, the traffic-rule recognition section 152, and the state recognition section 153. For example, the state prediction section 154 performs a process of predicting, for example, a state of the system-installed automobile, a state of the surroundings of the system-installed automobile, and a state of a driver.

Examples of the prediction-target state of the system-installed automobile include the behavior of the system-installed automobile, the occurrence of something unusual, and a travelable distance. Examples of the prediction-target state of the surroundings of the system-installed automobile include the behavior of a moving object around the system-installed automobile, a change in a state of a traffic light, and a change in environment such as weather. Examples of the prediction-target state of a driver include the behavior and the physical condition of a driver.

The state prediction section 154 provides data indicating a result of the prediction process to, for example, the route planning section 161, the behavior planning section 162, and the operation planning section 163 of the planning section 134 together with the data from the traffic-rule recognition section 152 and the state recognition section 153.

The route planning section 161 plans a route to a destination using data or a signal from the respective components of the vehicle control system 100, such as the map analyzer 151 and the state prediction section 154. For example, the route planning section 161 sets a route from a current location to a specified destination using a global map. Further, for example, the route planning section 161 changes a route as appropriate according to the states of, for example, a traffic jam, an accident, a traffic regulation, and a construction, as well as the physical condition of a driver. The route planning section 161 provides data indicating the planned route to, for example, the behavior planning section 162.

Using data or a signal from the respective components of the vehicle control system 100, such as the map analyzer 151 and the state prediction section 154, the behavior planning section 162 plans the behavior of the system-installed automobile in order to travel safely on the route within the time, the route and the time being planned by the route planning section 161. For example, the behavior planning section 162 makes plans about, for example, a start to move, a stop, a travel direction (such as a forward movement, a backward movement, a left turn, a right turn, and a change in direction), a lane for traveling, a traveling speed, and passing. The behavior planning section 162 provides data indicating the planned behavior of the system-installed automobile to, for example, the operation planning section 163.

Using data or a signal from the respective components of the vehicle control system 100, such as the map analyzer 151 and the state prediction section 154, the operation planning section 163 plans an operation of the system-installed automobile in order to achieve the behavior planned by the behavior planning section 162. For example, the operation planning section 163 makes plans about, for example, an increase in speed, a decrease in speed, and a traveling route. The operation planning section 163 provides data indicating the planned operation of the system-installed automobile to, for example, a speed-increase-and-decrease controller 172 and a direction controller 173 of the operation controller 135.

The operation controller 135 controls an operation of the system-installed automobile. The operation controller 135 includes the emergency-situation avoiding section 171, the speed-increase-and-decrease controller 172, and the direction controller 173.

Using a result of the detections performed by the vehicle-exterior information detector 141, the in-vehicle information detector 142, and the vehicle state detector 143, the emergency-situation avoiding section 171 performs a process of detecting emergency situations such as collision, contact, an entry into a dangerous zone, something unusual in a driver, and something unusual in a vehicle. When the emergency-situation avoiding section 171 detects the occurrence of an emergency situation, the emergency-situation avoiding section 171 plans an operation of the system-installed automobile in order to avoid the emergency situation such as a sudden stop or a quick turning. The emergency-situation avoiding section 171 provides data indicating the planned operation of the system-installed automobile to, for example, the speed-increase-and-decrease controller 172 and the direction controller 173.

The speed-increase-and-decrease controller 172 controls an increase and a decrease in speed in order to achieve the operation of the system-installed automobile planned by the operation planning section 163 or the emergency-situation avoiding section 171. For example, the speed-increase-and-decrease controller 172 calculates a control target value for a drive force generator or a braking device, the control target value being a value for achieving the planned increase in speed, the planned decrease in speed, or the planned sudden stop, and provides a control instruction indicating the calculated control target value to the driveline controller 107.

The direction controller 173 controls a direction in order to achieve the operation of the system-installed automobile planned by the operation planning section 163 or the emergency-situation avoiding section 171. For example, the direction controller 173 calculates a control target value for a steering mechanism, the control target value being a value for achieving the traveling route planned by the operation planning section 163 or the quick turning planned by the emergency-situation avoiding section 171, and provides a control instruction indicating the calculated control target value to the driveline controller 107.

3. Sequence of Process Performed by Vehicle Traveling Control Device

Next, a sequence of a process performed by the vehicle traveling control device is described with reference to the flowchart of FIG. 7.

Figure 7:
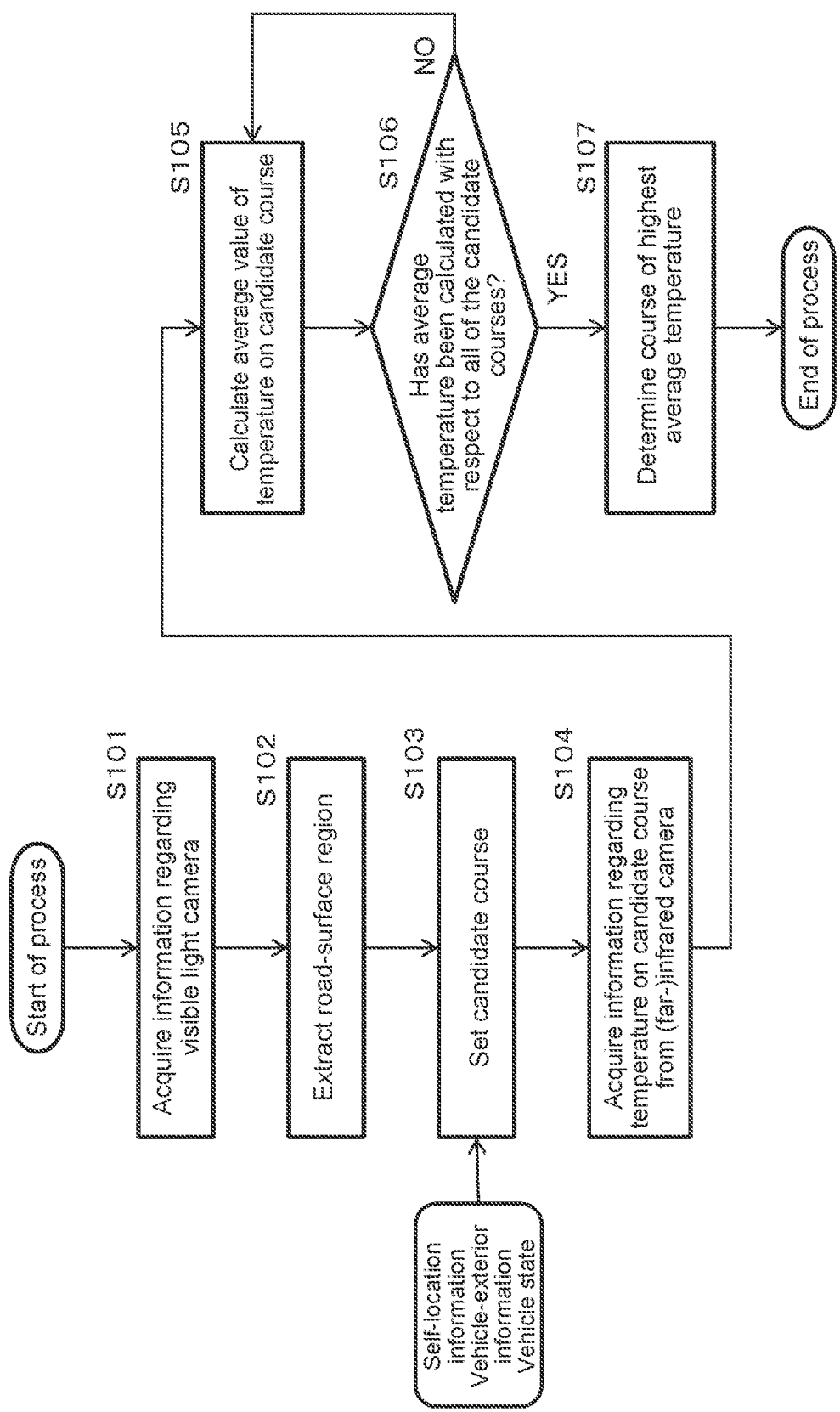
FIG. 7 is a flowchart of a sequence of a process performed by the vehicle traveling control device of the present disclosure.

FIG. 7 is a flowchart of the sequence of the process performed by the vehicle traveling control device. Note that, for example, a process in accordance with the flow illustrated in FIG. 7 is performed under the control of a controller (a data processing section) that includes, for example, a CPU that includes a function to execute a program in accordance with a program stored in the storage of the vehicle traveling control device.

Note that the flow described below is a process when the vehicle traveling control device 100 illustrated in FIG. 6 is applied.

This is an example of a process including performing automatic driving in an automatic driving mode, and further displaying recommended-route information on a display section.

The processes of respective steps illustrated in the flowchart are sequentially described below.

(Step S101)

First, in Step S101, the detector 131 of the automatic driving controller 112 acquires image-capturing information regarding a visible light camera.

This process is performed by the vehicle-exterior information detector 141 included in the detector 131 of the automatic driving controller 112 of the vehicle traveling control device 100 illustrated in FIG. 6.

The vehicle-exterior information detector 141 acquires an image of a region situated in a travel direction of a vehicle, the image being captured by a visible light camera included in the data acquisition section 102.

Figure 8:
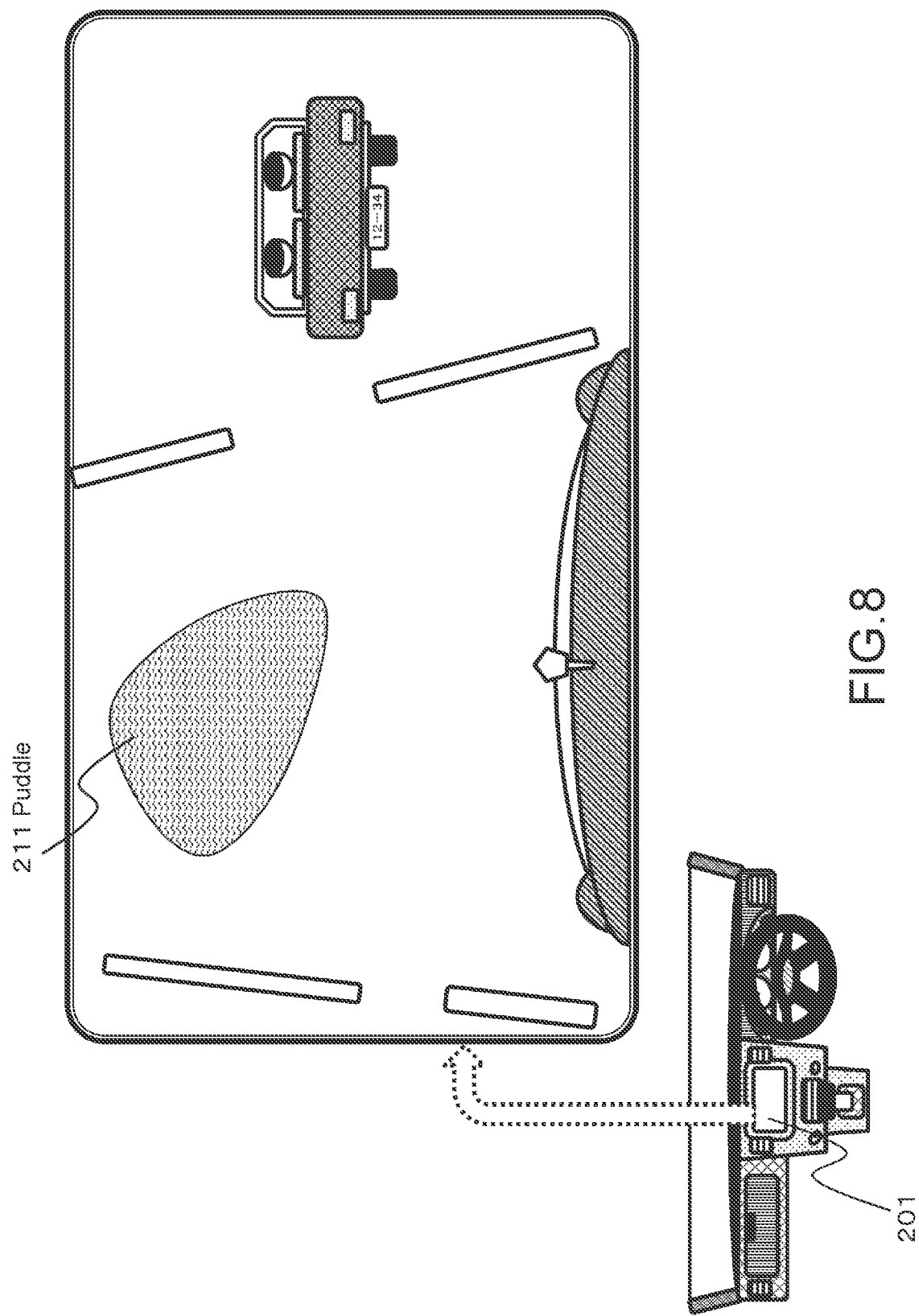
FIG. 8 is a diagram explaining the process performed by the vehicle traveling control device of the present disclosure and an example of a display on a display section.

For example, the captured image illustrated in FIG. 8 is acquired.

As illustrated in FIG. 8, this captured image is displayed on a display section (a display) 201 that is included in the output section 106, and a user (a driver) can perform observation.

The image illustrated in FIG. 8 as an example is an image indicating a state in which a vehicle (a system-installed vehicle) that a user (a driver) is driving, is traveling in a left lane out of the two lanes, there is a puddle 211 in front of the vehicle, and another vehicle is traveling in a right lane.

(Step S102)

Next, in Step S102, the vehicle-exterior information detector 141 extracts a road-surface region from the image of the region situated in the travel direction of a vehicle, the image being captured by the visible light camera.

Note that, for example, the method disclosed in Non-Patent Document 1

[http://www.vision.cs.chubu.ac.jp/MPRG/f_group/f133_mishina2013.pdf] is used as a method for extracting a road-surface region from an image.

Non-Patent Document 1 described above discloses a method for extracting a road-surface region from a visible light image using machine learning, and the road-surface region is extracted using such a method.

(Step S103)

Next, in Step S103, a candidate course is detected.

This process is performed by the state recognition section 153 of the automatic driving controller 112.

The state recognition section 153 sets a candidate travelable course from the road-surface region extracted in Step S102.

Note that, in the process of detecting a candidate course, information such as information regarding a self-location of a vehicle, traveling speed information (a vehicle state), and information regarding an obstacle around a vehicle (vehicle-exterior information) is input, and a plurality of safely travelable courses are determined considering the input information, the safely travelable course being a course that is travelable in the extracted road-surface region and in which there is no sharp change in course from a current traveling state.

Note that the information regarding a self-location of a vehicle is input from the self-location estimator 132. Further, the traveling speed information (the vehicle state) is input from the vehicle state detector 143. Furthermore, the information regarding an obstacle around a vehicle (the vehicle-exterior information) is input from the vehicle-exterior information detector 141.

Considering the pieces of information input by these respective processing sections, the state recognition section 153 sets a plurality of candidate courses that are travelable and in which there is no sharp change in course from a current traveling state.

Figure 9:
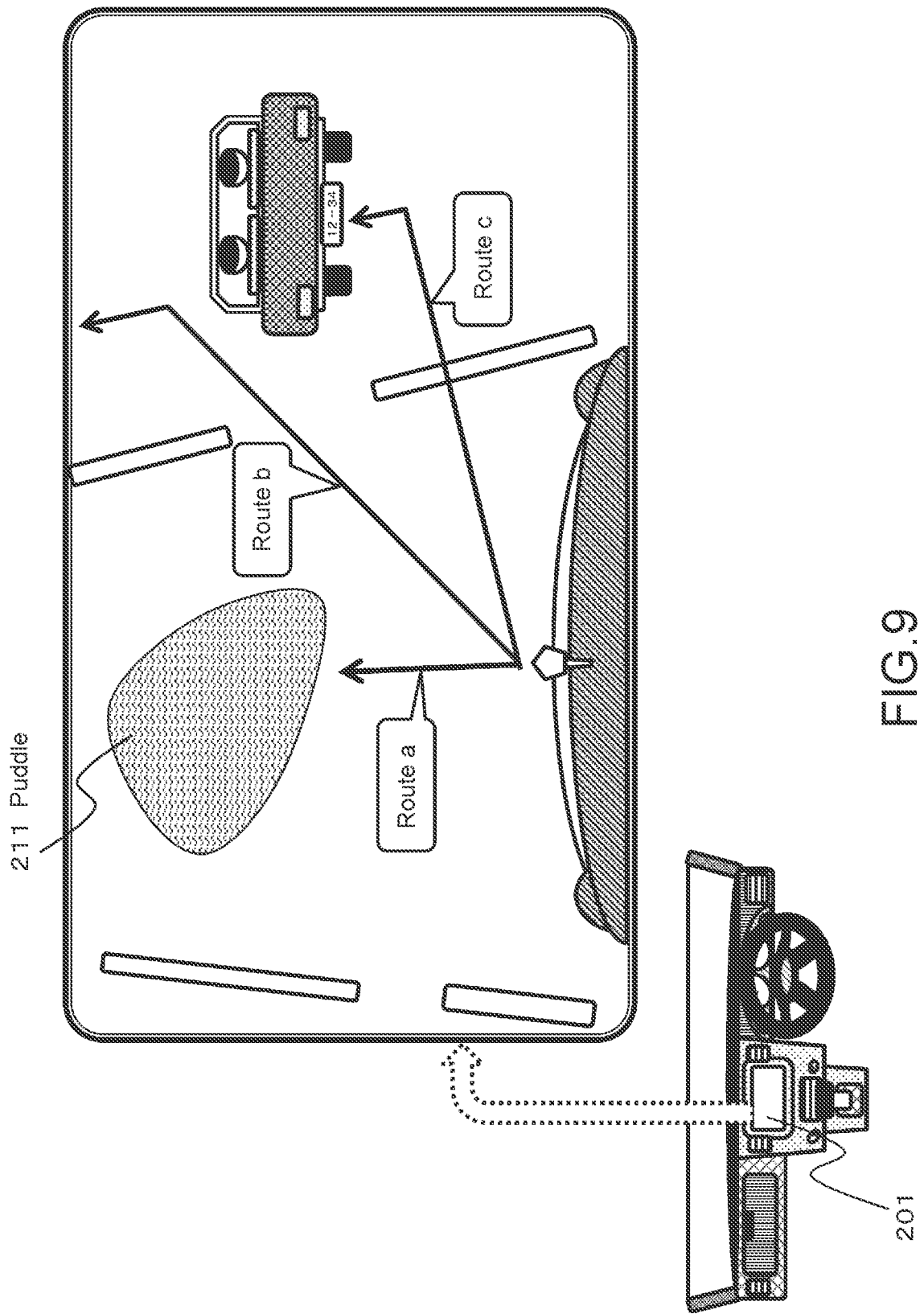
FIG. 9 is a diagram explaining the process performed by the vehicle traveling control device of the present disclosure and an example of a display on the display section.

For example, as illustrated in FIG. 9, three routes (routes a, b, and c) are detected as candidate courses.

As illustrated in FIG. 9, the candidate-course (route) information is displayed on the display section (the display) 201 included in the output section 106, and a user (a driver) can confirm the information.

(Step S104)

Next, in Step S104, information regarding a road-surface temperature on the candidate course detected in Step S103 is analyzed using an image acquired by a (far-)infrared camera.

This process is performed by the vehicle-exterior information detector 141 of the detector 131.

The vehicle-exterior information detector 141 acquires an image of a road surface in a travel direction of a vehicle, the image being captured by the (far-)infrared camera included in the data acquisition section 102, and analyzes a road-surface temperature on each of the candidate courses using a pixel value of the acquired far-infrared image.

As described above, the far-infrared image is, for example, a light-and-shade image depending on a temperature distribution. Specifically, it is acquired as a monochrome image that becomes whiter with a higher temperature, in which, for example, a high-temperature portion is represented in white and a low-temperature portion is represented in black. The vehicle-exterior information detector 141 analyzes a road-surface temperature on each of the candidate courses using a pixel value of such a far-infrared image.

A result of the analysis is input to the state recognition section 153.

Further, the analysis result is displayed on the display section (the display) 201 included in the output section 106, and a user (a driver) can confirm the analysis result.

Figure 10:
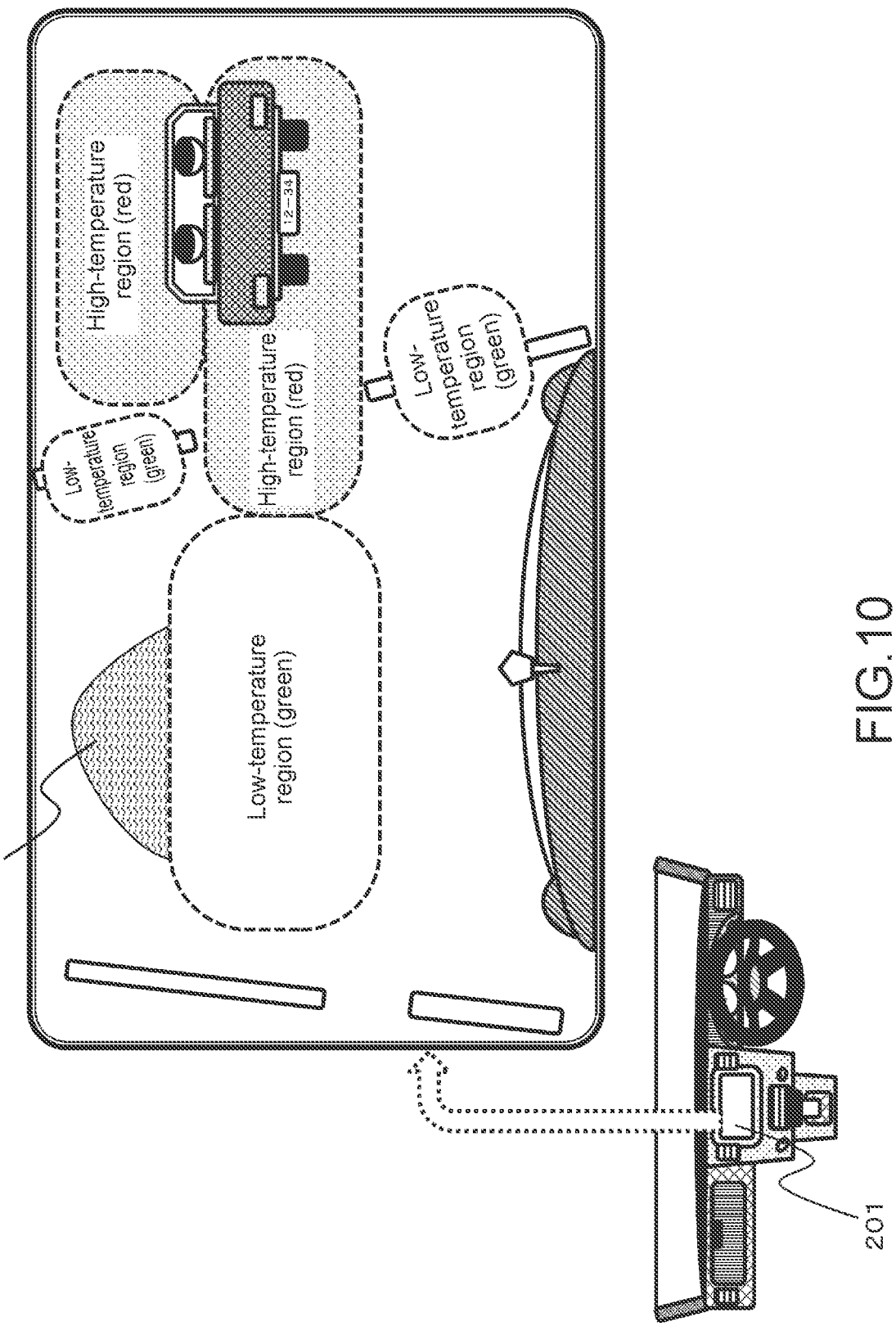
FIG. 10 is a diagram explaining the process performed by the vehicle traveling control device of the present disclosure and an example of a display on the display section.

For example, as illustrated in FIG. 10, the information regarding a road-surface temperature is displayed on the display section (the display) 201.

In the example illustrated in FIG. 10, a portion in which the puddle 211 exists is a low-temperature region, a region of a while line indicating a lane marking is also a low-temperature region, and the right lane is a high-temperature region.

Note that it is favorable that an output color depending on a temperature be set to perform display on the display section 201.

For example, as illustrated in FIG. 10, the high-temperature region is output in a red-color setting, and the low-temperature region is output in a green-color setting.

Such color-coding upon performing outputting enables a user (a driver) to immediately know a road-surface temperature for each region.

(Step S105)

The process of Step S105 is performed by the state recognition section 153.

The state recognition section 153 inputs the information regarding a road-surface temperature on each of the candidate courses that is acquired by the vehicle-exterior information detector 141 in Step S104, and, using the input information regarding a road-surface temperature on each of the candidate courses, the state recognition section 153 calculates an average value of a road-surface temperature on each of the candidate course.

For example, an average value of a temperature of a road surface having an area of about (vehicle width+2 m on its both sides)×(travel direction of 30 m to 100 m) is calculated for each candidate course.

The state recognition section 153 inputs the calculated average value of a road-surface temperature on each of the candidate courses to the state prediction section 154.

A specific example of the process of Step S105 is described.

For example, as illustrated in FIG. 9, when three routes (the routes a, b, and c) are detected as candidate courses, an average value of a temperature of a road surface having an area of about (vehicle width+2 m on its both sides)×(travel direction of 30 m to 100 m) is calculated for each of the routes a, b, and c.

Note that the area used to calculate an average temperature described above is a mere example, and it is favorable that a region for which an average temperature is to be calculated be determined considering, for example, a vehicle speed and a region for which a road-surface temperature is to be detected.

(Step S106)

The process of Step S106 is also performed by the state recognition section 153.

In Step S106, it is determined whether the calculation of an average road-surface temperature in Step S105 has been completed with respect to all of the candidate courses extracted in Step S103.

When the calculation of an average road-surface temperature has not been completed with respect to all of the candidate courses, the process returns to Step S105 and the process of calculating an average road-surface temperature is performed with respect to an unprocessed candidate course.

When the calculation of an average road-surface temperature has been completed with respect to all of the candidate courses, the process moves on to Step S107.

(Step S107)

The process of Step S107 is performed by the state prediction section 154.

Finally, in Step S107, the state prediction section 154 determines, to be a traveling course, a candidate course in which the temperature on the course has a largest average value. The determined traveling course is reported to the planning section 134, and a control of a vehicle is finally performed.

Specifically, a traveling control is performed such that the vehicle travels along the determined course.

In other words, the planning section 134 outputs, to the operation controller 135 that performs automatic driving of a vehicle, control data that causes the vehicle to travel along a course of a highest road-surface temperature.

The operation controller 135 controls an operation of the vehicle to cause the vehicle to travel along the course of a highest road-surface temperature.

Figure 11:
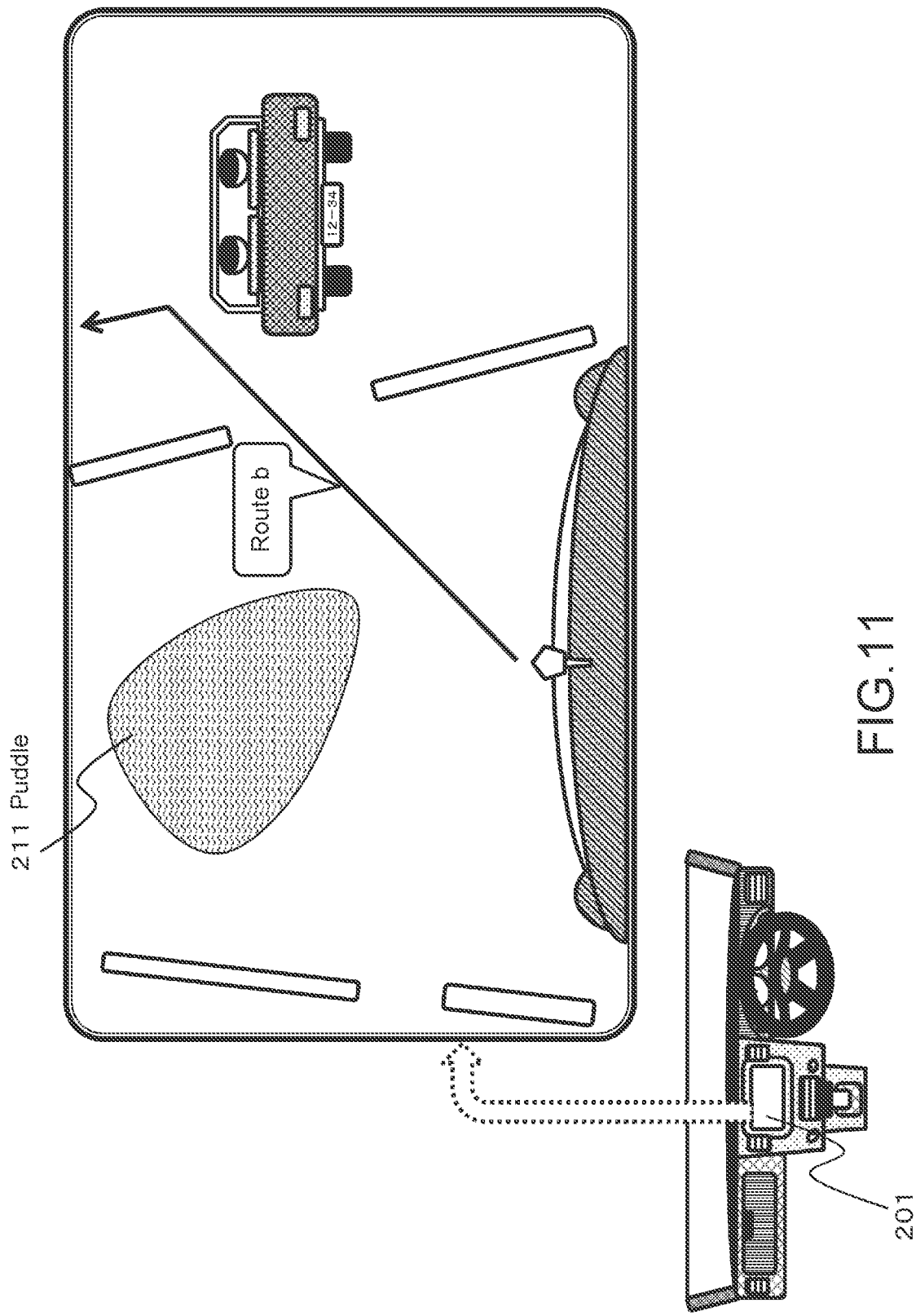
FIG. 11 is a diagram explaining the process performed by the vehicle traveling control device of the present disclosure and an example of a display on the display section.

Note that information regarding the determined traveling course (route) is displayed on the display section (the display) 201 included in the output section 106, as illustrated in FIG. 11, and a user (a driver) can confirm the information.

FIG. 11 illustrates an example of selecting the route b from among the routes a to c illustrated in FIG. 9.

As can be seen from the distribution of a temperature on each candidate course illustrated in FIG. 10, the route b is a route in which a vehicle travels in a region of a highest road-surface temperature.

The selection of such a traveling route makes it possible to travel in a portion of a high road-surface temperature, which results in being able to reduce a rolling resistance of a tire and to travel with improved fuel efficiency.

Note that the process in accordance with the flow illustrated in FIG. 7 is continuously performed repeatedly when a vehicle is traveling.

By continuously performing the process above, it becomes possible to travel while continuously selecting a region of a high road-surface temperature, which results in achieving an improvement in fuel efficiency when a vehicle is traveling.

The road-surface temperature varies depending on, for example, a road-surface state (such as a material of a pavement, and wet and dry) and whether there exists a vehicle ahead. For example, when there is a puddle on a course, such a portion with a puddle generally has a temperature lower than the surroundings of the portion.

The application of the configuration of the present disclosure makes it possible to select a course that permits avoidance of puddle, and this results in being able to improve fuel efficiency. Further, for example, when the pavement material of a portion of a road surface is different from that of the other portion, the road-surface temperature differs depending on a pavement material. For example, the road-surface temperature is low with respect to a white line. The application of the configuration of the present disclosure makes it possible to travel while avoiding such a region of a low road-surface temperature and selecting a road surface of a higher temperature, and this results in being able to improve fuel efficiency.

Further, for example, it is known that, when there exists a vehicle traveling ahead, the road-surface temperature varies to become higher due to heat from the vehicle (such as a frictional heat from a tire, a radiant heat from a vehicle, and a sensible heat induced due to a passage of a vehicle). The application of the configuration of the present disclosure makes it possible to select, when there exists a vehicle traveling ahead, a route that follows this vehicle, and this results in being able to travel with improved fuel efficiency.

As described above, the vehicle traveling control device of the present disclosure makes it possible to continuously measure a temperature of a road surface in a travel direction when a vehicle is traveling, to set a traveling route such that a region of a high road-surface temperature is selected, and to cause a vehicle to travel along the set route, and this results in being able to improve fuel efficiency with certainty.

Note that, in the embodiments described above, an example in which average values of a road-surface temperature of respective candidate courses are calculated as evaluation values for the respective candidate courses, and the calculated average values are compared, has been described, but, for example, maximum values or median values of a road-surface temperature of the respective candidate courses may be used as evaluation values.

4. Summary of Configuration of Present Disclosure

The embodiments of the present disclosure have been described above in details with reference to the specific embodiment. However, it is clear that those skilled in the art could make modifications or alterations thereto without departing from the scope of the present disclosure. In other words, the present disclosure has been described illustratively, and should not be restrictively interpreted. The claims should be considered in order to determine the scope of the present disclosure.

Note that the technology disclosed herein may take the following configurations.

(1) A vehicle traveling control device including:
a detector that analyzes an image captured by a far-infrared camera to analyze a distribution of a road-surface temperature; and
a state analyzer that determines a course of a highest road-surface temperature to be a traveling route, using the distribution of a road-surface temperature.

(2) The vehicle traveling control device according to (1), further including
a planning section that outputs control data to an operation controller that performs automatic driving of a vehicle, the control data being data for causing the vehicle to travel along the course of the highest road-surface temperature.

(3) The vehicle traveling control device according to (1) or (2), in which
the state analyzer
detects a candidate course travelable for a vehicle, the state analyzer detecting a plurality of the candidate courses,
calculates an average value of a road-surface temperature of each of the plurality of the candidate courses, and
determines, to be a traveling route, the candidate course having a largest average value of a road-surface temperature.

(4) The vehicle traveling control device according to (1) or (2), in which
the state analyzer
detects a candidate course travelable for a vehicle, the state analyzer detecting a plurality of the candidate courses,
calculates a maximum value or a median value of a road-surface temperature of each of the plurality of the candidate courses, and
determines, to be a traveling route, the candidate course having a largest maximum value or a largest median value of a road-surface temperature.

(5) The vehicle traveling control device according to (3) or (4), in which
the state analyzer
inputs at least one of information regarding a self-location of a vehicle, traveling speed information, or information regarding an obstacle around the vehicle, and
detects, as the candidate course, a course determined to be safely travelable according to the input information.

(6) The vehicle traveling control device according to any one of (1) to (5), in which
the detector
extracts a road-surface region from an image of a region situated in a travel direction of a vehicle, the image being captured by a visible light camera, and analyzes a distribution of a temperature of a road surface included in the extracted road-surface region.

(7) The vehicle traveling control device according to any one of (1) to (6), further including a display section that displays direction information regarding the course of the highest road-surface temperature.

(8) The vehicle traveling control device according to (7), in which the display section displays information indicating a temperature distribution of a road-surface temperature.

(9) The vehicle traveling control device according to (8), in which the display section displays, as the information indicating a temperature distribution of a road-surface temperature, information in which an output color depending on a temperature is set.

(10) A vehicle traveling control method that is performed in a vehicle traveling control device, the method including performing, by a detector, detection including analyzing an image captured by a far-infrared camera to analyze a distribution of a road-surface temperature; and performing, by a state analyzer, a state analysis including determining a course of a highest road-surface temperature to be a traveling route, using the distribution of a road-surface temperature.

(11) A program that causes a vehicle traveling control device to perform a vehicle traveling control, the vehicle traveling control including:

performing detection including causing a detector to analyze an image captured by a far-infrared camera to analyze a distribution of a road-surface temperature; and performing a state analysis including causing a state analyzer to determine a course of a highest road-surface temperature to be a traveling route, using the distribution of a road-surface temperature.

Further, a series of processes described herein can be performed using hardware or software or a combination of them. When a process performed using software is performed, a program in which a processing sequence is recorded can be installed on a memory to be executed, the memory being in a computer incorporated in dedicated hardware, or the program can be installed on a general-purpose computer to be executed, the general-purpose computer being capable of performing various processes. For example, the program can be recorded in a recording medium in advance. In addition to installing the program on a computer from a recording medium, the program can be received through a network such as a local area network (LAN) or the Internet to be installed on a recording medium such as a built-in hard disk.

Note that the various processes described herein are not limited to being chronologically performed in the description order, and they may be performed in parallel or individually according to the capability of a device that performs the processes, or as necessary. Further, a system herein is a logical collection of a plurality of devices, and is not limited to having a configuration in which each included device is situated in a single housing.

INDUSTRIAL APPLICABILITY

As described above, the configuration of the embodiment of the present disclosure makes it possible to travel while detecting a road-surface temperature and selecting a region of a high road-surface temperature, and thus to travel with improved fuel efficiency.

Specifically, for example, an image captured by a far-infrared camera is analyzed to analyze a distribution of a road-surface temperature, and a course of a highest road-surface temperature is determined to be a traveling route. Further, automatic driving along the course of the highest road-surface temperature is performed. Furthermore, a state of the distribution of a road-surface temperature, and a direction of the course of the highest road-surface temperature are displayed on a display section, so that a user (a driver) recognizes them. For example, a state analyzer detects a candidate course travelable for a vehicle, the state analyzer detecting a plurality of the candidate courses, calculates an average value of a road-surface temperature of each of the plurality of the candidate courses, and determines the candidate course having a largest average value of a road-surface temperature to be a traveling route.

This configuration makes it possible to travel while detecting a road-surface temperature and selecting a region of a high road-surface temperature, and thus to travel with improved fuel efficiency.

REFERENCE SIGNS LIST 10 automobile
20 far-infrared camera
30 visible light image
40 far-infrared image
50 display section
52 recommended-route information
100 vehicle traveling control device
101 input section
102 data acquisition section
103 communication section
104 in-vehicle device
105 output controller
106 output section
107 driveline controller
108 driveline system
109 body-related controller
110 body-related system
111 storage
112 automatic driving controller p 131 detector
132 self-location estimator
133 state analyzer
134 planning section
135 operation controller
141 vehicle-exterior information detector
142 in-vehicle information detector
143 vehicle state detector
151 map analyzer
152 traffic-rule recognition section
153 state recognition section
154 state prediction section
161 route planning section
162 behavior planning section
163 operation planning section
171 emergency-situation avoiding section
172 speed-increase-and-decrease controller
173 direction controller
201 display section

The invention claimed is:

1. A vehicle traveling control device comprising:
circuitry configured to
acquire an image of a region situated in a travel direction of a vehicle, the image being captured by a far-infrared camera to analyze a distribution of a road-surface temperature;

detect two or more candidate courses of the vehicle to be safely travelable based on vehicle state information of the vehicle and surrounding information of the vehicle acquired by a sensor, the state vehicle state information including at least one of a location of the vehicle, a pose of the vehicle, and movement of the vehicle, and the surrounding information of the vehicle including at least one of a type, a location, and movement of an obstacle object around the vehicle; and determine a course of a highest road-surface temperature to be a traveling route, based on the distribution of a road-surface temperature, the course being determined from the two or more candidate courses of the vehicle.

2. The vehicle traveling control device according to claim 1, wherein the circuitry is further configured to perform automatic driving of hg vehicle, the vehicle being guided to travel along the course of the highest road-surface temperature.

3. The vehicle traveling control device according to claim 1, wherein the circuitry is further configured to calculate an average value of the road-surface temperature of each of the plurality of the candidate courses, and determine, to be the traveling route, the candidate course having a largest average value of the road-surface temperature.

4. The vehicle traveling control device according to claim 1, wherein the circuitry is further configured to calculate a maximum value or a median value of the road-surface temperature of each of the plurality of the candidate courses, and determine, to be the traveling route, the candidate course having a largest maximum value or a largest median value of the road-surface temperature.

5. The vehicle traveling control device according to claim 3, wherein the circuitry is further configured to determine the candidate courses which is travelable in the travel direction of the vehicle without sharp change in course from a current traveling course.

6. The vehicle traveling control device according to claim 1, wherein the circuitry is further configured to extract a road-surface region from the image of the region situated in the travel direction of the vehicle, the image being captured by a visible light camera, and analyze the distribution of the temperature of the road surface included in the extracted road-surface region.

7. The vehicle traveling control device according to claim 1, further comprising a display that displays direction information regarding the course of the highest road-surface temperature.

8. The vehicle traveling control device according to claim 7, wherein the display displays information indicating a temperature distribution of a road-surface temperature.

9. The vehicle traveling control device according to claim 8, wherein the display displays, as the information indicating a temperature distribution of a road-surface temperature, information in which an output color depending on a temperature is set.

10. A vehicle traveling control method that is performed in a vehicle traveling control device, the method comprising:

acquiring, by a far-infrared camera, an image of a region situated in a travel direction of a vehicle, to analyze a distribution of a road-surface temperature;

detecting, by a sensor, two or more candidate courses of the vehicle to be safely travelable based on vehicle state information of the vehicle and surrounding information of the vehicle acquired by a sensor, the state vehicle state information including at least one of a location of the vehicle, a pose of the vehicle, and movement of the vehicle, and the surrounding information of the vehicle including at least one of a type, a location, and movement of an obstacle object around the vehicle; and determining a course of a highest road-surface temperature to be a traveling route, based on the distribution of a road-surface temperature, the course being determined from the two or more candidate courses of the vehicle.

11. A non-transitory computer-readable storage medium including computer executable instructions, wherein the instructions, when executed by a vehicle traveling control device, cause the vehicle traveling control device to perform a method, the method comprising:

acquiring, by a far-infrared camera, an image of a region situated in a travel direction of a vehicle, to analyze a distribution of a road-surface temperature;

detecting, by a sensor, two or more candidate courses of the vehicle to be safely travelable based on vehicle state information of the vehicle and surrounding information of the vehicle acquired by a sensor, the state vehicle state information including at least one of a location of the vehicle, a pose of the vehicle, and movement of the vehicle, and the surrounding information of the vehicle including at least one of a type, a location, and movement of an obstacle object around the vehicle; and determining a course of a highest road-surface temperature to be a traveling route, based on the distribution of a road-surface temperature, the course being determined from the two or more candidate courses of the vehicle.

12. The vehicle traveling control device according to claim 1, wherein the sensor includes at least one of an image-capturing device such as a time-of-flight (ToF) camera, a visible light camera, a stereo camera, a monocular camera, an environment sensor for detecting a weather condition, and a surroundings-information detection sensor for detecting the obstacle object around the vehicle.

13. The vehicle traveling control device according to claim 12, wherein the environment sensor for detecting the weather condition includes at least one of a raindrop sensor, a fog sensor, a sunlight sensor, and a snow sensor.

14. The vehicle traveling control device according to claim 12, wherein the surroundings-information detection sensor for detecting the obstacle object around the vehicle includes at least one of an ultrasonic sensor, a radar, LiDAR (light detection and ranging, laser imaging detection and ranging), and a sonar.

15. The vehicle traveling control device according to claim 14, wherein the surroundings-information detection sensor is configured to detect, as the obstacle object around the vehicle, at least one of other vehicle, a human being, a structure, a road, a traffic light, a traffic sign, and a road sign.

16. The vehicle traveling control device according to claim 12, wherein the sensor includes a global navigation satellite system (GNSS) receiver that receives a GNSS signal from a GNSS satellite to detect a current location of the vehicle.

17. The vehicle traveling control device according to claim 1, wherein the circuitry is further configured to analyze a location and a state of a traffic light around the vehicle, a traffic regulation around the vehicle, and a travelable lane, based on information acquired by the sensor.

18. The vehicle traveling control device according to claim 2, wherein the circuitry is further configured to perform the automatic driving which is a cooperative control in order to provide a function of an advanced driver assistance system (ADAS) including at least one of collision avoidance, impact relaxation of the vehicle, traveling after a leading vehicle based on a distance between the vehicles, traveling while maintaining a vehicle speed of the vehicle, a warning of a collision of the vehicle, and a warning of deviation of the vehicle from a predetermined lane.

19. The vehicle traveling control device according to claim 18, wherein the circuitry is further configured to perform the cooperative control in order to the achieve automatic driving which is to drive the vehicle autonomously without an operation performed by a driver of the vehicle.

\* \* \* \* \*